US012418141B1

(12) United States Patent
Yue

(10) Patent No.: US 12,418,141 B1
(45) Date of Patent: Sep. 16, 2025

(54) MAGNETIC CONNECTOR STRUCTURE FOR DATA CABLE

(71) Applicant: Fan Gao Le Trade (Shenzhen) Co., Ltd., Guangdong (CN)

(72) Inventor: Wenyong Yue, Guangdong (CN)

(73) Assignee: Fan Gao Le Trade (Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 19/173,911

(22) Filed: Apr. 9, 2025

(30) Foreign Application Priority Data

Feb. 27, 2025 (CN) ........................ 202520327224.7

(51) Int. Cl.

| | |
|---|---|
| ***H01R 13/00*** | (2006.01) |
| ***H01F 7/02*** | (2006.01) |
| ***H01R 13/58*** | (2006.01) |
| ***H01R 13/60*** | (2006.01) |

(52) U.S. Cl.

CPC ....... *H01R 13/5804* (2013.01); *H01F 7/0252* (2013.01); *H01R 13/60* (2013.01); *H01R 2201/06* (2013.01)

(58) Field of Classification Search

CPC ................ H01R 13/6205; H01R 11/30; H01R 2103/00; H01R 13/22

See application file for complete search history.

(56) References Cited

U.S. PATENT DOCUMENTS

| | | | | |
|---|---|---|---|---|
| 7,344,380 | B2 * | 3/2008 | Neidlein ............ | H01R 13/6205 439/378 |
| 9,147,965 | B2 * | 9/2015 | Lee .................... | H01R 13/6205 |
| 10,666,309 | B2 * | 5/2020 | Carnevali ............ | H04B 1/3888 |
| 2011/0018484 | A1 * | 1/2011 | Fullerton ............... | H02K 29/00 310/156.43 |

* cited by examiner

*Primary Examiner* — Phuong Chi Thi Nguyen

(74) *Attorney, Agent, or Firm* — Hawaii Patent Services; Nathaniel K. Fedde; Kenton N. Fedde

(57) ABSTRACT

The present disclosure provides a magnetic connector structure for a data cable, which comprises a cable body and a connector. The connector comprises an input end connector and an output end connector. A magnetic block is provided on the side of each of the input end connector and the output end connector close to the cable body. A through hole for the cable body to pass through is provided in the middle of the magnetic block, and the magnetic block is fixedly connected to the connector.

18 Claims, 4 Drawing Sheets

MAGNETIC CONNECTOR STRUCTURE FOR DATA CABLE

CROSS-REFERENCE TO RELATED APPLICATIONS

This application claims the priority of China Patent Application No. 202520327224.7 filed on Feb. 27, 2025, entitled "a magnetic connector structure for a data cable", and the entire contents of the above application, including the amendments therein, are all incorporated herein by reference.

TECHNICAL FIELD

The present disclosure relates to the technical field of data cables, and particularly to a magnetic connector structure for a data cable.

BACKGROUND

Currently, smart wearable devices, smart home devices, consumer digital products, etc. on the market all need to be powered or charged during use. At this time, a data cable with a charging plug is required to ensure normal operation. The data cable is also called a charging cable.

In some specific occasions, such as on an office desk or in a bedroom, a data cable will be placed. Even when not in use, after the data cable is separated from the electrical device, such as from a mobile phone, the data cable will be casually placed in place, and the other end will always be connected to the power supply.

Currently, when the data cables on the market are used in occasions such as on an office desk or in a bedroom, when not in use, there is no restraint at the connector of the data cable, and the other end of the data cable is still connected to the power supply. This can easily lead to accidental contact between the data cable connector and other items, causing heat generation and resulting in safety accidents.

The existing US patent with publication number U.S. Pat. No. 11,011,284B1 discloses a "Data line convenient for storage". In this invention, when the cable body of the data cable is stacked and wound, the magnetic rings of adjacent layers can limit the distance between adjacent layers and attract each other, which facilitates the fixation of adjacent layers and storage, and can avoid the occurrence of accidents.

However, although the magnetic structure of this invention fixes the connector, the cable body part still needs to be manually wound and organized, which is cumbersome to operate. In scenarios where users need to leave quickly (such as during a meeting break or an emergency going out), due to time constraints, users often casually discard the data cable on the desktop, which still leads to a messy desktop and has certain safety hazards.

SUMMARY

The present disclosure provides a magnetic connector structure for a data cable to solve the problems raised in the above background art.

To achieve the above invention object, the present disclosure adopts the following technical solutions:

A magnetic connector structure for a data cable includes a cable body and a connector. The connector includes an input end connector and an output end connector. A magnetic block is provided on the side of the input end connector and the output end connector close to the cable body. A through hole for the cable body to pass through is provided in the middle of the magnetic block, and the magnetic block is fixedly connected to the connector.

A magnetic connector structure for a data cable includes a cable body and a connector. A magnetic connector is provided on the side of the connector close to the cable body. The magnetic connector includes a magnetic block and an engagement plate, and the magnetic block and the engagement plate can be adsorbed by a magnetic force. A through hole for the cable body to pass through is provided in the middle of the magnetic block.

The beneficial effects of the present disclosure compared with the prior art are as follows:

When the data cable is not in use and the output end connector is separated from the electrical equipment such as a mobile phone, the other end is still connected to the power supply. At this time, the user only needs to place the output end connector separated from the electrical equipment on the iron sheet. The magnetic block is attracted to the engagement plate to form a binding force, which fixes the output end connector and prevents it from moving randomly. Thus, it avoids accidental contact with other items, such as documents and mouse pads on the office desk, or bedding in the bedroom and other flammable objects, reducing potential safety hazards. At the same time, it also avoids the messy situation on the desktop. Moreover, when the input end connector is separated from the power supply, the output end connector and the input end connector can be placed on the engagement plate together, which is convenient for organizing them, easy and fast, without the need for manual organization by the staff. Meanwhile, by setting the fixation structure, the engagement plate can be flexibly fixed at different positions, such as on the desktop or the wall, so that it can be applied to different scenarios.

BRIEF DESCRIPTION OF DRAWINGS

The drawings, which form a part of this application, are used to provide a further understanding of the present disclosure. The schematic embodiments of the present disclosure and the descriptions thereof are used to explain the present disclosure and do not constitute an improper limitation of the present disclosure. In the drawings.

Figure 1:
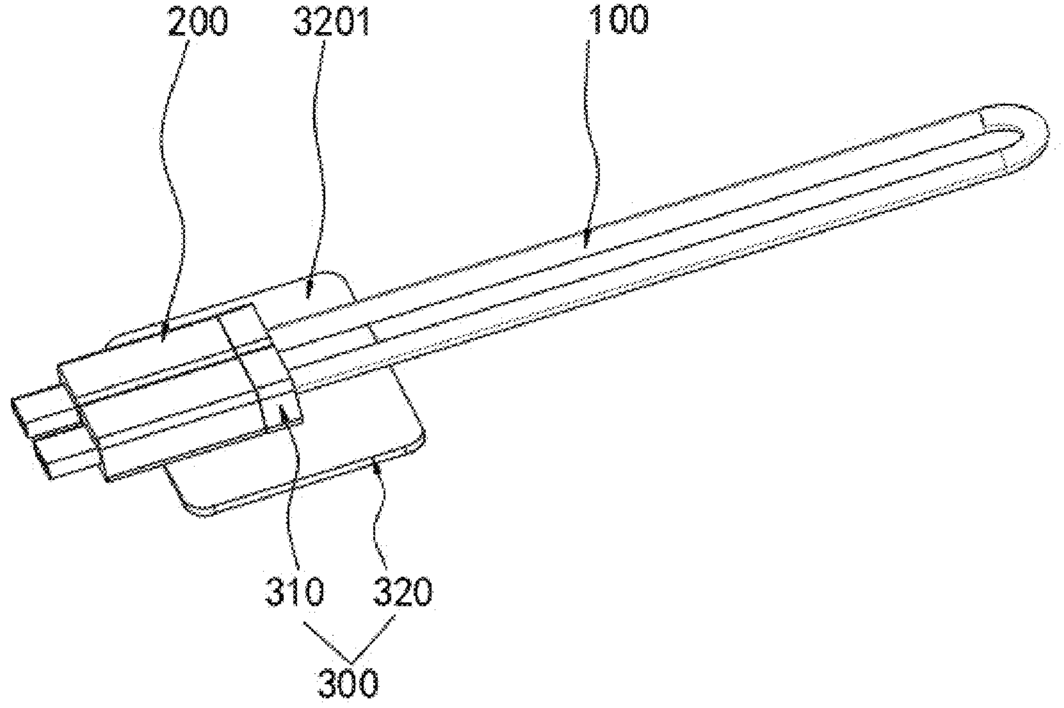
FIG. 1 is a schematic structural diagram of an embodiment implementing the present disclosure.

Reference signs: Cable body (100); Connector (200); Output end connector (210); Input end connector (220); Magnetic connector (300); Magnetic block (310); Input end magnetic block (3101); Output end magnetic block (3102); Engagement plate (320); Adsorption surface (3201); Fixation surface (3202); Through hole (330); Fixation structure (400); Sliding groove (410); Fixation block (420); Suction cup (430); Movable clamp (440); Fixed clamp plate (4401);

Movable clamp plate (4402); Small iron plate (450); Small magnetic plate (460); Rotating plate (500).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

As shown in FIGS. 1 to 7, a magnetic connector structure for a data cable includes a cable body 100 and a connector 200. A magnetic connector 300 is provided on the side of the connector 200 close to the cable body 100. The magnetic connector 300 includes a magnetic block 310 and an engagement plate 320. The magnetic block 310 and the engagement plate 320 can be attracted by a magnetic force. A through hole 330 for the cable body 100 to pass through is provided in the middle of the magnetic block 310. The connector 200 includes an input end connector 220 and an output end connector 210. The magnetic block 310 includes an input end magnetic block 3101 and an output end magnetic block 3102. The input end magnetic block 3101 is connected to the input end connector 220, and the output end magnetic block 3102 is connected to the output end connector 210.

When the data cable is not in use and the output end connector 210 is separated from the power-consuming device such as a mobile phone, the other end is still connected to the power supply. At this time, the user only needs to place the output end connector 210 separated from the power-consuming device on the iron sheet. Through the attraction between the magnetic block 310 and the engagement plate 320, a binding force is formed to fix the output end connector 210 so that it cannot move freely. Thus, accidental contact with other items, such as documents on the office desk and mouse pads, or bedding in the bedroom and other flammable objects, is avoided, reducing potential safety hazards. At the same time, the messy situation on the desktop is also avoided. Meanwhile, when the input end connector 220 is separated from the power supply, the output end connector 210 and the input end connector 220 can be placed on the engagement plate 320 together, which is convenient for organizing them, easy and fast, without the need for manual organization by the staff.

Figure 7:
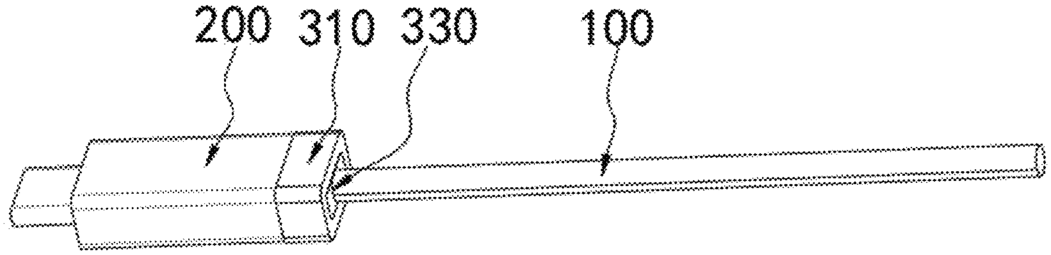
FIG. 7 is a second schematic diagram of the structure of the cable body and the connector in FIG. 1.

As shown in FIG. 7, in other embodiments, the cross-sectional size and shape of the input end magnetic block 3101 are the same as those of the input end connector 220; the cross-sectional size and shape of the output end magnetic block 3102 are the same as those of the output end connector 210. With the above design, a physical structure with seamless transition is formed between the two, eliminating the step difference of the traditional spliced joint, and forming continuous and smooth styling lines visually, avoiding the abruptness of the traditional magnetic accessories.

Figure 6:
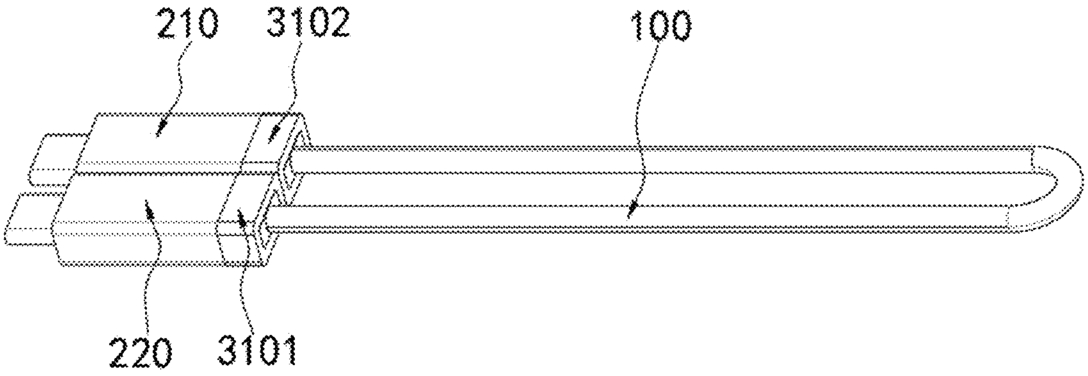
FIG. 6 is a first schematic diagram of the structure of the cable body and the connector in FIG. 1.

As shown in FIG. 6 and FIG. 7, in other embodiments, each side line of the magnetic block 310 is provided with a rounded corner. When the user touches the magnetic block 310 in a dark environment, the rounded corner design can eliminate the risk of scratching at the right-angled edges.

As shown in FIG. 7, in other embodiments, the width of the through hole 330 is greater than the diameter of the cable body 100. With the above design, a certain gap can be formed between the through hole 330 and the cable body 100, so that the cable body 100 can freely deform in this gap when being bent.

In other embodiments, the inner wall of the through hole 330 is provided with an elastic buffer layer made of silica gel or rubber, which is used to reduce the bending wear of the cable body 100.

In other embodiments, a heat insulation layer made of mica sheet or ceramic fiber is provided between the magnetic block 310 and the connector 200. When the data cable is in fast charging or high-power transmission, the inside of the connector 200 is prone to generate heat. If the heat is directly conducted to the magnetic block 310, it is easy to cause demagnetization of the magnet (magnetic force attenuation at high temperature) or aging of the insulation layer of the cable body 100. The heat insulation layer composed of mica sheet or ceramic fiber can effectively block the heat transfer to the magnetic block 310, avoiding the decline of magnetic performance, and at the same time protecting the cable body 100 and the circuit components inside the connector 200.

As shown in FIGS. 1 to 5, in other embodiments, one side of the engagement plate 320 is an adsorption surface 3201. The adsorption surface 3201 can be magnetically adsorbed to the magnetic block 310. The other side is a fixation surface 3202, and a fixation structure 400 is provided on the fixation surface 3202.

By providing the fixation structure 400, the engagement plate 320 can be flexibly fixed at different positions, such as on a desktop or a wall, so that it can be applied to different scenarios.

In other embodiments (not shown), a groove can be opened on the adsorption surface 3201, and a protrusion adapted to the groove is installed on the bottom surface of the magnetic block 310. The cooperation between the groove and the protrusion can ensure the precise alignment and limitation between the magnetic block 310 and the adsorption surface 3201. This design can effectively prevent the lateral shaking of the magnetic block 310 on the adsorption surface 3201 and ensure stability.

Figure 3:
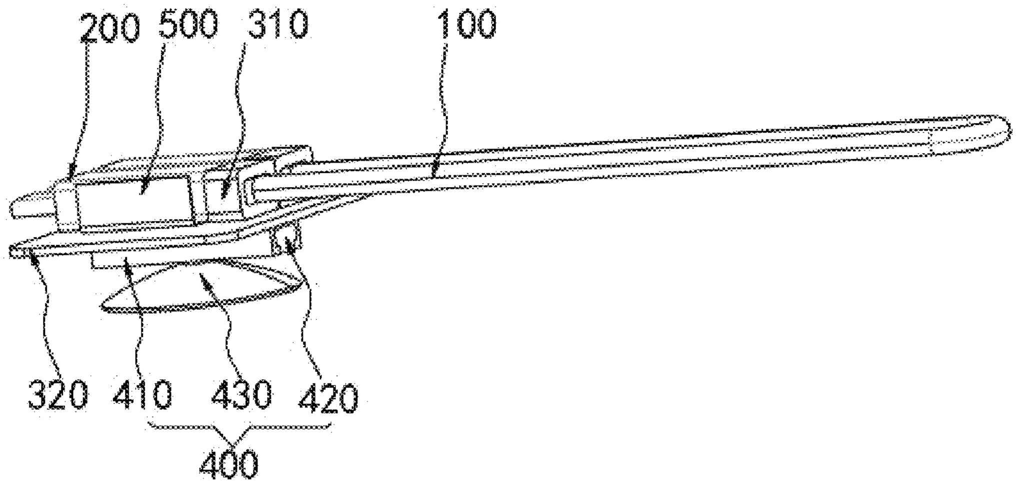
FIG. 3 is a second schematic diagram of the fixation structure in FIG. 1.
Figure 4:
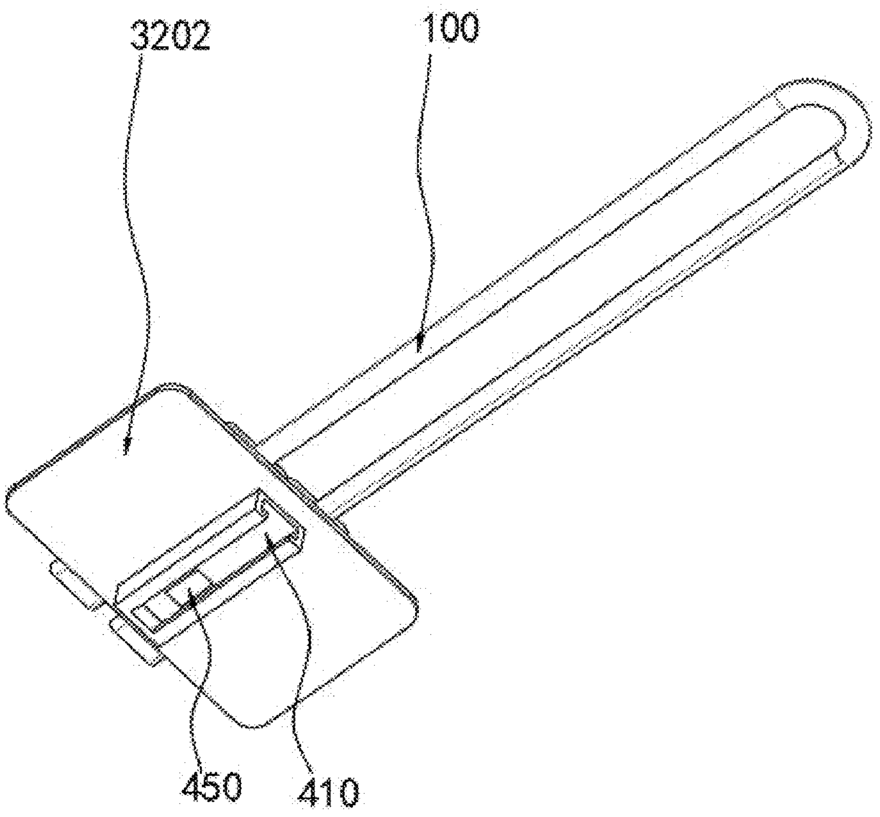
FIG. 4 is a schematic diagram of the inside of the sliding groove in FIG. 1.
Figure 5:
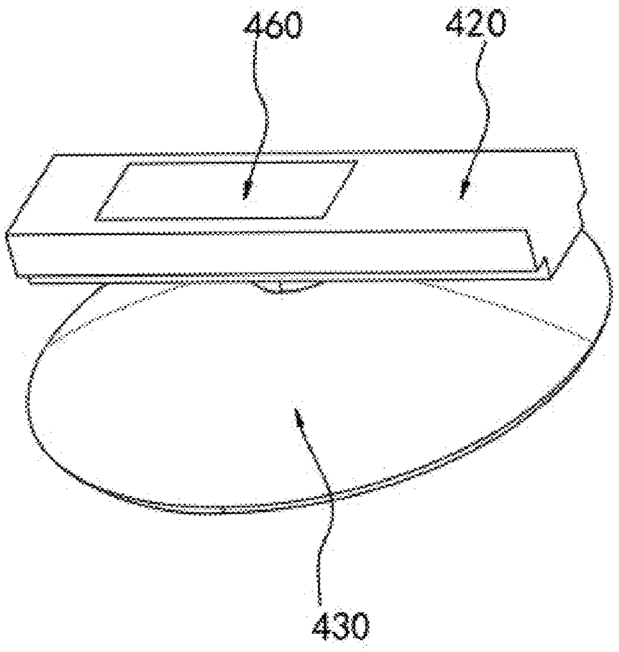
FIG. 5 is a schematic diagram of the structure of the suction cup and the fixation block in FIG. 3.

As shown in FIG. 3, in other embodiments, the fixation structure 400 includes a sliding groove 410 provided on the fixation surface 3202. A fixation block 420 is slidably connected in the sliding groove 410, and a suction cup 430 is provided on the fixation block 420. By providing the suction cup 430, the fixation block 420 can be fixed on a wall or glass. At the same time, by providing the sliding groove 410, the fixation block 420 can form a detachable design with the engagement plate 320, which is convenient for users to replace the suction cup 430 and other structures.

In other embodiments, the sliding groove 410 and the fixation block 420 can be integrally arranged. The integral arrangement eliminates the connection gap between the sliding groove 410 and the fixation block 420, and avoids the structural instability caused by the loosening or wear of the connection part.

As shown in FIGS. 2 to 5, in other embodiments, both the sliding groove 410 and the fixation block 420 are T-shaped. This design achieves a highly stable mechanical interlock through the geometric characteristics of the T-shaped structure. The sliding groove 410 of the T-shaped structure fits closely with the fixation block 420, which can effectively eliminate lateral shaking and ensure stability under the action of complex multi-dimensional external forces.

Figure 2:
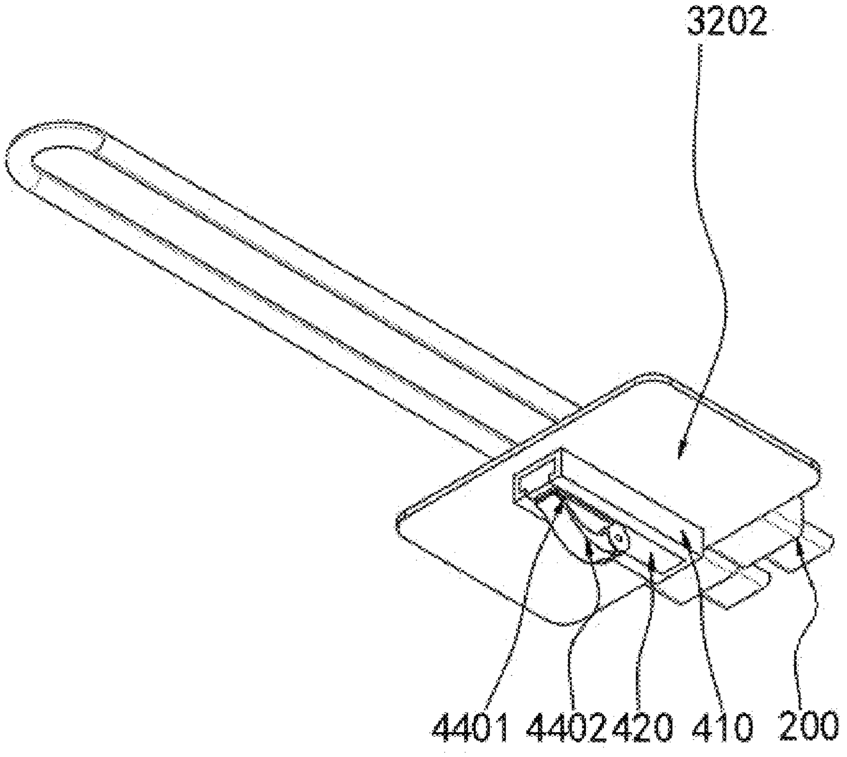
FIG. 2 is a first schematic diagram of the fixation structure in FIG. 1.

As shown in FIG. 2, in other embodiments, a movable clamp 440 is provided on the fixation block 420. The movable clamp 440 includes a fixed clamp plate 4401 fixedly connected to the fixation block 420. The fixed clamp plate 4401 is rotatably connected to a movable clamp plate 4402. The fixed clamp plate 4401 and the movable clamp plate 4402 can be used in cooperation to clamp a sheet-like object. Through the cooperation of the fixed clamp plate 4401 and the movable clamp plate 4402, the clamping force can be evenly distributed on both sides of the sheet-like object, so that the engagement plate 320 can be stably fixed on the sheet-like object.

As shown in FIGS. 1 to 6, in other embodiments, a small iron plate 450 is provided at the bottom of the sliding groove 410, and a small magnetic plate 460 is provided on the side of the fixation block 420 close to the bottom of the sliding groove 410. The assembly process of the magnetic structure is simple, reducing the use of complex mechanical fixation methods (such as screws, bolts, etc.) and lowering the assembly difficulty and time cost.

As shown in FIG. 3, in other embodiments, rotating plates 500 are provided on both sides of the engagement plate 320. When the magnetic connector 300 is used in conjunction with the engagement plate 320, both rotating plates 500 flip inward. The rotating plate is L-shaped, and an iron block is provided at one end of the rotating plate 500 close to the middle of the engagement plate 320. When the connector 200 is placed on the engagement plate 320, the rotating plates 500 on both sides can clamp and fix the connector 200 laterally, improving the stability and effectively preventing the connector 200 from sliding or shifting on the engagement plate 320.

In other embodiments (not shown), an LED light can be integrated on the connector 200, and a sensor can be provided on the engagement plate 320. When the connector 200 contacts the engagement plate 320, the LED light can automatically light up, which is convenient for users to find the connector 200 in a dark environment.

In summary, from the above description, it can be seen that the present disclosure achieves the following technical effects: When the data cable is not in use and the output end connector 210 is separated from the electrical equipment such as a mobile phone, the other end is still connected to the power supply. At this time, users only need to place the output end connector 210 separated from the electrical equipment on the iron sheet. Through the attraction between the magnetic block 310 and the engagement plate 320, a binding force is formed to fix the output end connector 210 and prevent it from moving freely. This avoids accidental contact with other items, such as documents on the office desk and mouse pads; flammable items like bedding in the bedroom, reducing potential safety hazards. At the same time, it also avoids a messy desktop. When the input end connector 220 is separated from the power supply, the output end connector 210 and the input end connector 220 can be placed on the engagement plate 320 together for easy organization, which is quick and does not require manual organization by staff. Meanwhile, by setting the fixation structure 400, the engagement plate 320 can be flexibly fixed at different positions, such as on the desktop or the wall, so that it can be applied to different scenarios.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A magnetic connector structure for a data cable, comprising a cable body and a connector, wherein the connector comprises an input end connector and an output end connector; and a magnetic block is provided on a side of each of the input end connector and the output end connector close to the cable body; and a through hole for the cable body to pass through is provided in the middle of the magnetic block, and the magnetic block is fixedly connected to the connectors.

2. The magnetic connector structure for a data cable according to claim 1, wherein each side line of the magnetic block is provided with a rounded corner.

3. The magnetic connector structure for a data cable according to claim 1, wherein a width of the through hole is greater than a diameter of the cable body.

4. The magnetic connector structure for a data cable according to claim 1, wherein the magnetic block comprises an input end magnetic block and an output end magnetic block, wherein the input end magnetic block is connected to the input end connector, and the output end magnetic block is connected to the output end connector.

5. The magnetic connector structure for a data cable according to claim 4, wherein a cross-section of the input end magnetic block is the same in size and shape as that of the input end connector.

6. The magnetic connector structure for a data cable according to claim 4, wherein a cross-section of the output end magnetic block is the same in size and shape as that of the output end connector.

7. A magnetic connector structure for a data cable, comprising a cable body and a connector, wherein a magnetic connector is provided on a side of the connector close to the cable body; and the magnetic connector comprises a magnetic block and an engagement plate, wherein the magnetic block and the engagement plate can be adsorbed by a magnetic force; and a through hole for the cable body to pass through is provided in the middle of the magnetic block.

8. The magnetic connector structure for a data cable according to claim 7, wherein an elastic buffer layer made of silicone or rubber is provided on an inner wall of the through hole to reduce the bending wear of the cable body.

9. The magnetic connector structure for a data cable according to claim 7, wherein a heat insulation layer made of mica sheet or ceramic fiber is provided between the magnetic block and the connector.

10. The magnetic connector structure for a data cable according to claim 7, wherein rotating plates are provided on both sides of the engagement plate, and when the magnetic connector is used in cooperation with the engagement plate, both of the rotating plates flip inward.

11. The magnetic connector structure for a data cable according to claim 10, wherein the rotating plate is L-shaped, and an iron block is provided at an end of the rotating plate close to a middle position of the engagement plate.

12. The magnetic connector structure for a data cable according to claim 7, wherein one side of the engagement plate is an adsorption surface that can be magnetically adsorbed to the magnetic block, and the other side is a fixation surface, wherein the fixation surface is provided with a fixation structure.

13. The magnetic connector structure for a data cable according to claim 12, wherein a groove is provided on the adsorption surface, and a protrusion adapted to the groove is installed on a bottom surface of the magnetic block.

14. The magnetic connector structure for a data cable according to claim 12, wherein the fixation structure comprises a sliding groove provided on the fixation surface, a fixation block is slidably connected in the sliding groove, and a suction cup is provided on the fixation block.

15. The magnetic connector structure for a data cable according to claim 14, wherein the sliding groove and the fixation block are both T-shaped.

16. The magnetic connector structure for a data cable according to claim 12, wherein the fixation structure comprises a sliding groove provided on the fixation surface, a fixation block is slidably connected in the sliding groove, and a movable clamp is provided on the fixation block.

17. The magnetic connector structure for a data cable according to claim 16, wherein the movable clamp comprises a fixed clamp plate fixedly connected to the fixation block, the fixed clamp plate is rotatably connected to a movable clamp plate, and the fixed clamp plate and the movable clamp plate are used in cooperation to clamp a sheet-like object.

18. The magnetic connector structure for a data cable according to claim 16, wherein a small iron plate is provided at a bottom of the sliding groove, and a small magnetic plate is provided on a side of the fixation block close to the bottom of the sliding groove.

* * * * *